United States Patent
Moyer (10) Patent No.: US 8,051,226 B2
(45) Date of Patent: Nov. 1, 2011

(54) CIRCULAR BUFFER SUPPORT IN A SINGLE INSTRUCTION MULTIPLE DATA (SIMD) DATA PROCESSOR

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 410 days.

(21) Appl. No.: 12/139,208

(22) Filed: Jun. 13, 2008

(65) Prior Publication Data

US 2009/0313442 A1 Dec. 17, 2009

(51) Int. Cl.
*G06F 3/00* (2006.01)

(52) U.S. Cl. ............................... 710/52; 710/53

(58) Field of Classification Search .................. None
See application file for complete search history.

(56) References Cited

U.S. PATENT DOCUMENTS

| | | | |
|---|---|---|---|
| 6,009,261 A * | 12/1999 | Scalzi et al. ............... | 703/26 |
| 6,334,176 B1 | 12/2001 | Scales, III et al. | |
| 6,665,790 B1 | 12/2003 | Glossner, III et al. | |
| 6,915,411 B2 * | 7/2005 | Moreno et al. ............... | 712/22 |
| 7,107,436 B2 | 9/2006 | Moyer | |
| 7,275,148 B2 | 9/2007 | Moyer et al. | |
| 7,315,932 B2 | 1/2008 | Moyer | |
| 7,475,221 B1 * | 1/2009 | Metzgen et al. ............... | 711/219 |
| 2006/0001575 A1 | 1/2006 | Jo et al. | |
| 2006/0015705 A1 | 1/2006 | Raubuch | |

OTHER PUBLICATIONS

Circular Bufffer, May 11, 2008, Wikipedia, en.wikipedia.org/wiki/Circular_buffer, pp. 1-9.*
U.S. Appl. No. 11/657,510, filed Sep. 5, 2003.
U.S. Appl. No. 11/871,668, filed Oct. 12, 2007.
U.S. Appl. No. 11/871,659, filed Oct. 12, 2007.

* cited by examiner

*Primary Examiner* — Eron J Sorrell
(74) *Attorney, Agent, or Firm* — Joanna G. Chiu; Daniel D. Hill (57) ABSTRACT

A method is provided for generating a control vector. The method comprising: providing a circular buffer having a plurality of storage elements that are arranged sequentially from a designated first storage element to a designated last storage element, and when the designated last storage element of the plurality of storage elements is accessed, the access continuing in a sequential order continuing with the designated first storage element; determining a beginning storage element of the plurality of storage elements to be accessed; and generating a control vector, the control vector comprising a plurality of index values, each of the plurality of index values corresponding to one of the plurality of storage elements of the circular buffer to be accessed in the sequential order from the beginning storage element to an ending storage element.

14 Claims, 6 Drawing Sheets

FIG. 3 evlvcb[.u]   rD,rA,rB

| 0 | 5 6 | 10 11 | 15 16 | 20 21 | 30 31 |
|---|---|---|---|---|---|
| 0 0 0 1 0 0 | rD | rA | rB | subopcode | 0 |

FIG. 4 evperm2   rD,rA,rB

| 0 | 5 6 | 10 11 | 15 16 | 20 21 22 | 30 31 |
|---|---|---|---|---|---|
| 0 0 0 1 0 0 | rD | rA | rB | 0 X X X X X X X X | X |

FIG. 5 evlvcbm[.u]   rD,rA,rB

| 0 | 5 6 | 10 11 | 15 16 | 20 21 | 27 28 | 30 31 |
|---|---|---|---|---|---|---|
| 0 0 0 1 0 0 | rD | rA | rB | subopcode | mask | 0 |

CIRCULAR BUFFER SUPPORT IN A SINGLE INSTRUCTION MULTIPLE DATA (SIMD) DATA PROCESSOR

BACKGROUND

1. Field

This disclosure relates generally to data processors, and more specifically, to data processors that execute instructions which create control vectors for supporting circular buffers.

2. Related Art

Increased performance in data processing systems can be achieved by allowing parallel execution of operations on multiple elements of a vector. One type of processor available today is a vector processor which utilizes vector registers for performing vector operations. However, vector processors, while allowing for higher performance, also have increased complexity and cost as compared with processors using scalar general purpose registers. That is, a vector register file within vector processors typically includes N vector registers, where each vector register includes a bank of M registers for holding M elements. Another type of known processor is a single-instruction multiple-data (SIMD) scalar processor (also referred to as a "short-vector machine") which allows for limited vector processing while using any existing scalar general purpose register (GPR). Therefore, although the number of elements per operation is limited as compared to vector processors, reduced hardware is required.

Many different applications executed on SIMD processors use circular buffers to hold SIMD elements. For example, many types of filtering algorithms in digital signal processing (DSP) applications use circular buffers to hold sets of input samples and computed output samples. However, inefficiencies arise when using circular buffers, since the addressed data elements "wrap" around a particular memory or register boundary. Extracting a set of elements around the "wrap" point into a SIMD register requires overhead to properly handle the wrapping, which results in reduced efficiency.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one embodiment, data processing instructions are provided which support the use of circular buffers in a data processing system. For example, in one embodiment, one or more types of SIMD instructions can be used to generate a control vector which may then be used within the data processing system to extract the appropriate data elements from a circular buffer that is stored within the data processing system. For example, in one embodiment, a permutation instruction can use the generated control vector to appropriately and efficiently extract data elements from the circular buffer, even around a wrap around point of the circular buffer. Therefore, with the use of just two single SIMD instructions, a control vector can be generated and circular buffer data elements can be extracted, even around a wrap point of the circular buffer.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Also, as used herein, a word includes 4 bytes, and a doubleword includes 8 bytes. However, in alternate embodiments, a word may be defined as 2 bytes and a doubleword as 4 bytes. The symbol "$" or "0x" preceding a number indicates that the number is represented in its hexadecimal or base sixteen form. The symbol "%" preceding a number indicates that the number is represented in its binary or base two form.

Figure 1:
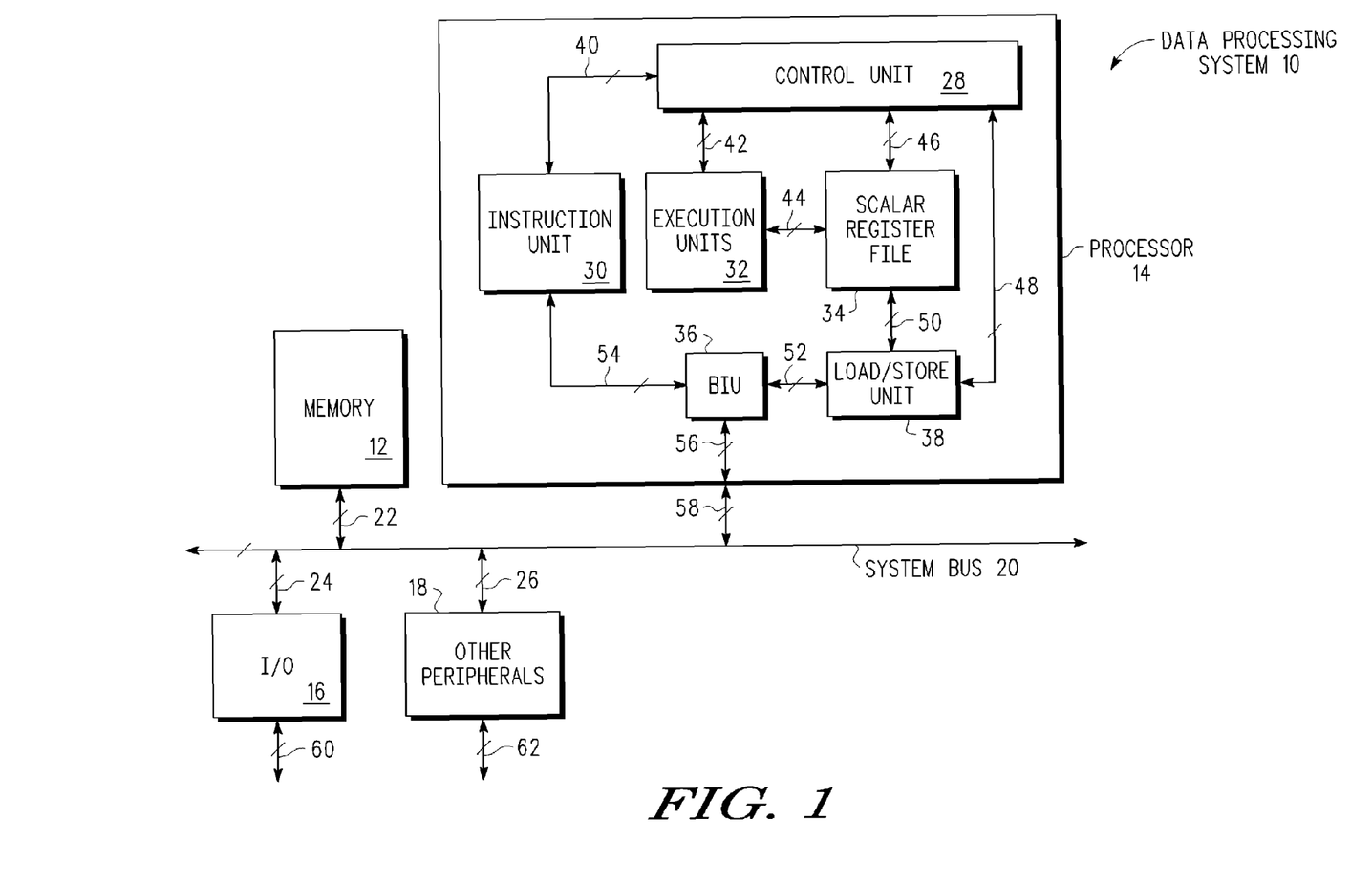
FIG. 1 illustrates in block diagram form a SIMD data processor in accordance with one form of the present invention.

FIG. 1 illustrates, in block diagram form, a data processing system 10 in accordance with one embodiment of the present invention. Data processing system 10 includes a memory 12, a processor 14, an input/output (I/O) 16, other peripherals 18 and a system bus 20. Memory 12 is bidirectionally coupled to system bus 20 via conductors 22, I/O 16 is bidirectionally coupled to system bus 20 via conductors 24, the other peripherals 18 are bidirectionally coupled to system bus 20 via conductors 26, and processor 14 is bidirectionally coupled to system bus 20 via conductors 58. In one embodiment, the other peripherals 18 may include one or more peripherals, where each can be any type of peripheral, such as a universal asynchronous receiver transmitter (UART), a real time clock (RTC), a keyboard controller, other memories, etc. Some or all of the other peripherals 18 may be capable of communicating information external to data processing system 10 via conductors 62. I/O 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include elements other than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32, a scalar register file 34, a bus interface unit (BIU) 36, and a load/store unit 38. Control unit 28 is bidirectionally coupled to instruction unit 30 via conductors 40, to execution units 32 via conductors 42, to scalar register file 34 via conductors 46, and to load/store unit 38 via conductors 48. Execution units 32 are bidirectionally coupled to scalar register file 34 via conductors 44, and scalar register file 34 is bidirectionally coupled to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information from and to control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, execution units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating point units, etc.

Scalar register file 34 includes N general purpose registers (GPRs), where N can be any integer greater than or equal to one. In one embodiment, scalar register file 34 includes thirty-two 64-bit registers. As used here in, a scalar register indicates a register which has a one dimensional map and thus holds only one row of data (e.g. a 1 by M-bit register), where M can be any integer greater or equal to one. In one embodiment, M is 64, and each register is thus capable of storing a 64-bit quantity. Scalar register file 34 can provide or receive control information or data to or from control unit 28 via conductors 46. In the embodiments described herein, each GPR in scalar register file 34 includes 8 bytes, where, when used for SIMD operations, each byte may correspond to a vector element. Therefore, each GPR may store up to 8 vector elements. Alternate embodiments may use different sizes for the vector elements.

Operation of processor 14 will not be described in more detail herein other than for those portions that are needed in understanding the various embodiments described herein. Also note that existing designs for data processing systems having operands stored in a scalar general purpose register file can be modified as needed to execute the control vector for circular buffer extraction instructions (e.g. evlvcb and evlvcbm) and vector permutation instructions (e.g. evperm2) described herein. Furthermore, note that since scalar register files may be used, currently existing designs may be retrofitted to allow for the instructions to be described herein. (However, note that the embodiments described herein may be used with any type of register file and is not limited to only scalar register files.)

Figure 2:
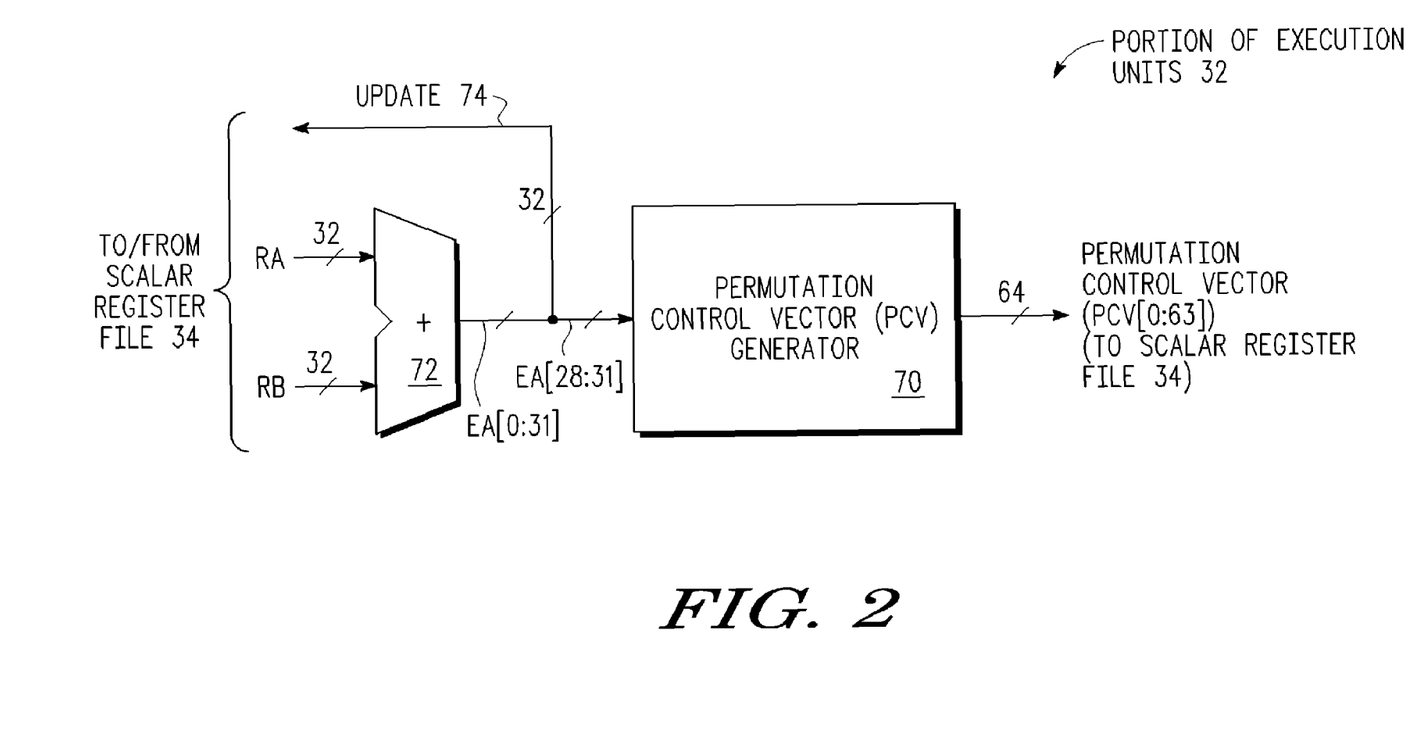
FIG. 2 illustrates in block diagram form a portion of the execution units of the SIMD data processor of FIG. 1, in accordance with form of the present invention.

Illustrated in FIG. 2, is a block diagram of a portion of execution units 32 which generates a permutation control vector (PCV) in response to execution of a load vector for circular buffer extraction (evlvcb) instruction. FIG. 2 includes an adder 72 which receives the contents of two registers from scalar register file 34 (RA and RB), and provides the result at its output. In one embodiment, at least a portion of the result is provided as an input to permutation control vector (PCV) generator 70. Using this portion of the result, PCV generator 70 generates a PCV which is provided for storage back into scalar register file 34. In the illustrated embodiment, each register in scalar register file 34 is a 64 bit register, however, effective addresses and address operands are limited to 32 bits, therefore, adder 72 provides a 32-bit output labeled as effective address [0:31] (EA[0:31]). This full 32-bit output can be provided as update value 74. The lowest order 4 bits of this output, EA[28:31], are provided to PCV generator 70. As will be discussed below, PCV generator 70 uses EA[28:31] to generate a control vector as defined by the evlvcb or evlvcbm instructions. In one embodiment, a plurality of logic gates may be designed, as known in the art, to generate the control vector.

Figure 3:
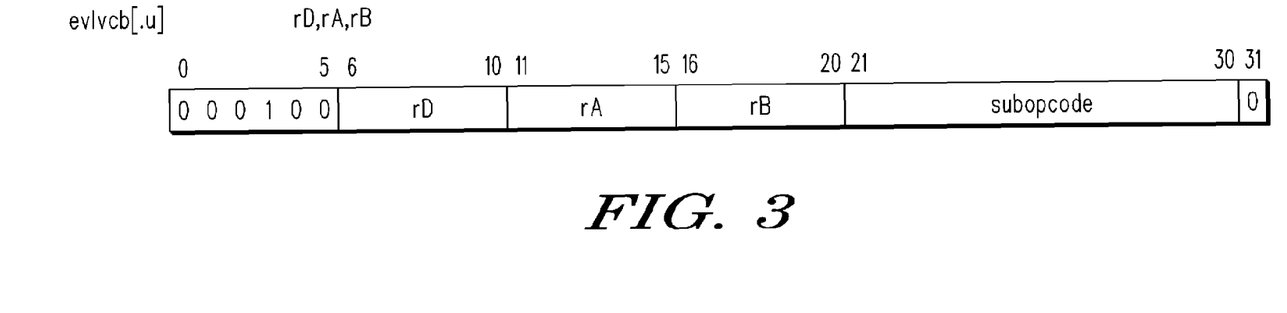
FIG. 3 illustrates one form of a load vector (i.e. control vector) for circular buffer extraction instruction for execution by the SIMD data processor of FIG. 1.

Illustrated in FIG. 3 is one form of a control vector for circular buffer extraction instruction (evlvcb). In the illustrated embodiment, evlvcb is a thirty-two bit instruction which indicates a destination register, rD, and two source registers, rA and rB. The evlvcb instruction may, in one embodiment, be specified with a ".u" following the "evlvcb" indicating that an update of rA is to be performed as part of the operation of the instruction. Note that without the ".u", no update of rA is performed. The evlvcb instruction includes an opcode field to identify the function or type of instruction. A destination field within the instruction is a destination register identifier labeled "rD" which identifies a register D within the scalar register file 34. A first source field within the instruction is a source register identifier labeled "rA" which identifies a register A within scalar register file 34, and a second source field within the instruction is a source register identifier labeled "rB" which identifies a register B within scalar register file 34. The instruction also includes a subopcode field which may be used to further specify the functionality of the instruction. Alternatively, other bit length instructions may be implemented and the bit size of each instruction field is implementation specific. Also, in other embodiments additional fields or other fields may be implemented. Further, the ordering of the fields rD, rA and rB may be changed to other sequences than the one as illustrated in FIG. 3. Also, in an alternate embodiment, the contents of either rA or rB or both can be provided as immediate values of the instruction.

Upon execution of an evlvcb instruction, the contents of rA and rB are used to calculate an effective address (e.g., EA[0:31]). A control vector is calculated based on the byte offset of the effective address and placed into rD. This control vector may then be used by an evperm2 instruction to perform an extraction of data from a circular buffer of elements contained in a single or pair of GPRs (in scalar register 34).

The effective address (EA) for the evlvcb instruction is calculated by adding the contents of rA (rA[0:31]) to the contents of rB (rB[0:31]). That is, EA[0:31]="the contents of rA+the contents of rB". Therefore, in one embodiment, the contents of rA may be referred to as a base address and the contents of rB may be referred to as the address offset. The lower 4 bits of EA (EA[28:31]) provides an element offset value. Based on the element offset value (i.e. offset value), a particular control vector is stored into rD[0:63]. For example, referring back to FIG. 2, the offset value (i.e., EA[28:31]), which is taken from the output of adder 72, is provided to PCV generator 70 to generate a PCV. For example, if the offset value is 0x0, then rD[0:63]=0x00 01 02 03 04 05 06 07. These 8 values correspond to 8 indices that can be used by a permutation instruction, as will be described below. Each of the 8 values is stored in one byte of rD. These 8 values form a control vector for an offset value of 0x0. If the offset value is 0x1, then rD[0:63]=0x01 02 03 04 05 06 07 08. If the offset value is 0x2, then rD[0:63]=0x02 03 04 05 06 07 08 09. If the offset value is 0x3, then rD[0:63]=0x03 04 05 06 07 08 09 0A. If the offset value is 0x4, then rD[0:63]=0x03 04 05 06 07 08 09 0A 0B. If the offset value is 0x5, then rD[0:63]=0x05 06 07 08 09 0A 0B 0C. If the offset value is 0x6, then rD[0:63]= 0x06 07 08 09 0A 0B 0C 0D. If the offset value is 0x7, then rD[0:63]=0x07 08 09 0A 0B 0C 0D 0E. If the offset value is 0x8, then rD[0:63]=0x08 09 0A 0B 0C 0D 0E 0F. If the offset value is 0x9, then rD[0:63]=0x09 0A 0B 0C 0D 0E 0F 00. If the offset value is 0xA, then rD[0:63]=0x0A 0B 0C 0D 0E 0F 00 01. If the offset value is 0xB, then rD[0:63]=0x0B 0C 0D 0E 0F 00 01 02. If the offset value is 0xC, then rD[0:63]= 0x0C 0D 0E 0F 00 01 02 03. If the offset value is 0xD, then rD[0:63]=0x0D 0E 0F 00 01 02 03 04. If the offset value is 0xE, then rD[0:63]=0x0E 0F 00 01 02 03 04 05. If the offset value is 0xF, then rD[0:63]=0x0F 00 01 02 03 04 05 06. Therefore, based on the lower order bits of EA (i.e. the element offset value), different control vectors are generated which may be used to implement a circular buffer, as will be described in examples below.

Also, if there is a ".u" following the evlvcb, an update of rA occurs. That is, upon execution of an evlvcb.u instruction, a control vector is generated, as described above, and then the value of EA[0:31] gets stored to rA as the new base address.

Figure 4:
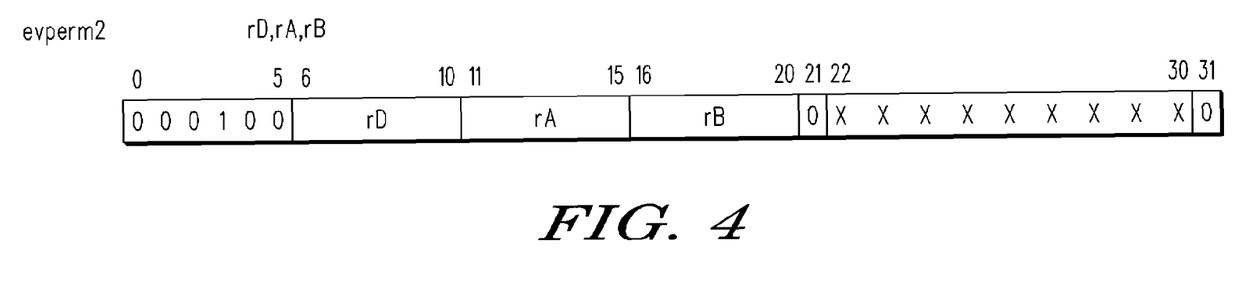
FIG. 4 illustrates one form of a vector permutation instruction for execution by the SIMD data processor of FIG. 1.

Illustrated in FIG. 4 is one form of a vector permutation instruction (evperm2). In the illustrated embodiment, evperm2 is a thirty-two bit instruction which indicates a destination register, rD, and two source registers, rA and rB. The evperm2 instruction includes an opcode field to identify the function or type of instruction. A destination field within the instruction is a destination register identifier labeled "rD" which identifies a register D within the scalar register file 34. A first source field within the instruction is a source register identifier labeled "rA" which identifies a register A within scalar register file 34, and a second source field within the instruction is a source register identifier labeled "rB" which identifies a register B within scalar register file 34. The instruction also includes a subopcode field which may be used to further specify the functionality of the instruction. Alternatively, other bit length instructions may be implemented and the bit size of each instruction field is implementation specific. Also, in other embodiments additional fields or other fields may be implemented. Further, the ordering of the fields rD, rA and rB may be changed to other sequences than the one as illustrated in FIG. 4. In the examples provided herein, each vector element of rA, rB, and rD is one byte in size; therefore, each of rA, rB, and rD can store up to 8 vector elements or data elements. However, in alternate embodiments, other sizes may be used. Also, in an alternate embodiment, the contents of either rA or rB or both can be provided as immediate values of the instruction.

Upon execution of an evperm2 instruction, the contents of rA and rB are concatenated into a 128-bit source vector consisting of 16 bytes (bytes 0:15). The contents of rD are copied to a temporary select vector. For each byte in the destination vector, a byte is selected from either the source vector or a constant of 0x00 by the corresponding byte of the select vector. The selected byte values are placed into rD. Note that, as will be described in examples below, the initial values of rD can be provided by the execution of the evlvcb instruction. That is, the execution of the evlvcb instruction generates a control vector, as described above, where this control vector may provide the values for the temporary select vector used to select values from the source vector. In this manner, data can be extracted from the source vector defined by the concatenation of rA and rB to implement a circular buffer.

Figure 5:
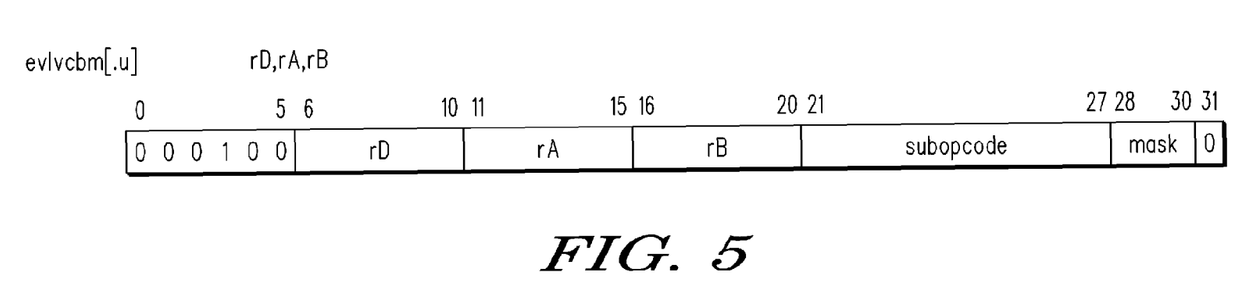
FIG. 5 illustrates one form of a load vector for circular buffer extraction with mask instruction for execution by the SIMD data processor of FIG. 1.

Illustrated in FIG. 5 is another form of a control vector for circular buffer extraction instruction (evlvcbm). In the illustrated embodiment, evlvcbm is a thirty-two bit instruction which indicates a destination register, rD, and two source registers, rA and rB. The evlvcbm instruction may, in one embodiment, be specified with a ".u" following the "evlvcbm" indicating that an update of rA is to be performed. Note that without the ".u", no update of rA is performed. The evlvcbm instruction includes an opcode field to identify the function or type of instruction. A destination field within the instruction is a destination register identifier labeled "rD"

which identifies a register D within the scalar register file 34. A first source field within the instruction is a source register identifier labeled "rA" which identifies a register A within scalar register file 34, and a second source field within the instruction is a source register identifier labeled "rB" which identifies a register B within scalar register file 34. The instruction also includes a subopcode field which may be used to further specify the functionality of the instruction. The instruction also includes a 3-bit mask field which allows selection of up to 7 vector elements of rD to be "masked". That is, in one embodiment, one or more bytes of the low order portion of the generated control vector, specified by the mask field, is set to 0xFF. Alternatively, other bit length instructions may be implemented and the bit size of each instruction field is implementation specific. Also, in other embodiments additional fields or other fields may be implemented. Further, the ordering of the fields rD, rA and rB may be changed to other sequences than the one as illustrated in FIG. 3.

Upon execution of an evlvcbm instruction, the contents of rA and rB are used to calculate an effective address (e.g., EA[0:31]). A control vector is calculated based on the byte offset of the effective address and placed into rD. The control vector is then masked by setting each of the low order elements of the control vector specified by the mask field to 0xFF, thus setting a "mask" number of vector elements of the control vector to 0xFF. This control vector may then be used by an evperm2 instruction to perform an extraction of data from a circular buffer of elements contained in a single or pair of GPRs (in scalar register 34) and concurrently set the "mask" number of lower order vector elements to 0x00. Note that the effective address for the evlvcbm instruction and the control vector can be generated in the same manner as described above with respect to the evlvcb instruction. For example, EA[0:31]="the contents of rA+the contents of rB", where the lower 4 bits of EA (EA[28:31]) provides an element offset value that is used to generate the control vector values. In one embodiment, the element offset values described above for the evlvcb instruction generate the same corresponding control vector values for the evlvcbm instruction. Also, as described above with respect to the evlvcb instruction, if there is a ".u" following the evlvcbm instruction, an update of rA occurs. That is, upon execution of an evlvcbm.u instruction, a control vector is generated, as described above, and then the value of EA[0:31] gets stored to rA as the new base address.

Figure 6:
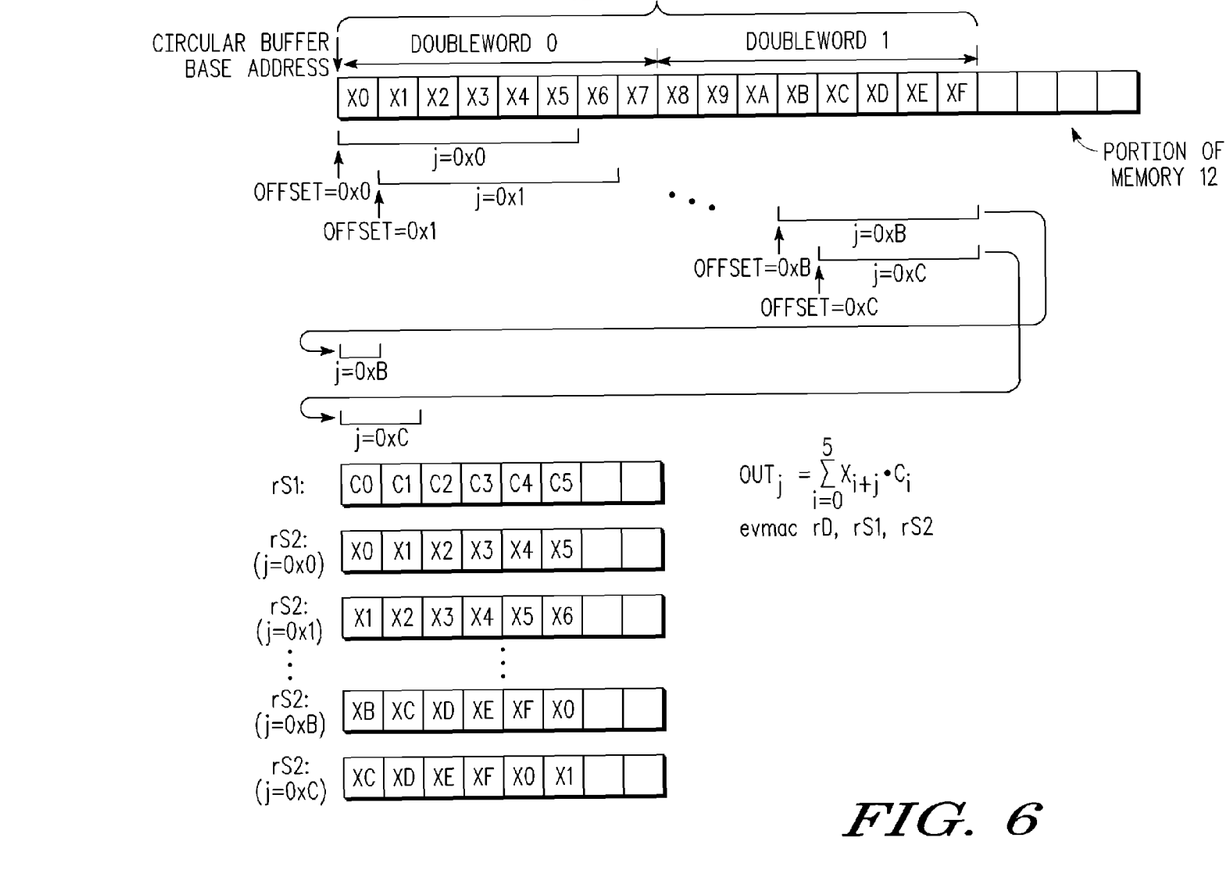
FIG. 6 illustrates in block diagram form a portion of memory 12 and a portion of the general purpose registers of the scalar registers of the data processor of FIG. 1 and associated data flow in response to extraction of elements from a circular buffer at various points in time in accordance with one example.

FIG. 6 illustrates in block diagram form a portion of memory 12 and a portion of the GPRs of the scalar register file 34 and associated data flow in response to extraction of elements from a circular buffer at various points in time in accordance with one example. For example, a portion of memory 12 may store a circular buffer of 16 byte-sized elements (X0-XF) starting at the circular buffer base address. In one embodiment, the circular buffer base address is aligned to a 16 byte boundary. This circular buffer can be considered to have a designated first storage element (which stores X0) to a designated last storage element (which stores XF), and when the designated last storage element is accessed, the access continues in a sequential order continuing with the designated first storage element. That is, upon accessing XF, access can wrap around to access X0. There are many applications in which the data of the circular buffer needs to be extracted. For example, in one embodiment, a filtering operation may be performed using a subset of the data of the circular buffer (e.g. 6 buffer elements) as well as a set of coefficients (e.g. C0, C1, C2, C3, C4, and C5). In one example, such an operation may be defined as follows in Equation 1:

$$Out_j = \sum_{i=0}^{5} X_{i+j} \cdot C_i \qquad \text{Equation 1}$$

That is, for each value of j, the corresponding output, $Out_j$, is as shown in equation 2:

$$Out_j = X_j \cdot C0 + X_{j+1} \cdot C1 + X_{j+2} \cdot C2 + X_{j+3} \cdot C3 + X_{j+4} \cdot C4 + X_{j+5} \cdot C5 \qquad \text{Equation 2}$$

Therefore, in one embodiment, the coefficients C0-C5 can be stored in a first source register, rS1, of scalar register file 34. Then for each value of j, a subset of 6 circular buffer elements ($X_j$-$X_{j+5}$) can be stored in a second source register, rS2, of scalar register file 34. Then, for each value of j, a vector multiply accumulate instruction, such as in the form of evmac rD,rS1, rS2 (as known in the art), may be executed to obtain the value of $Out_j$ as shown in Equation 2. Therefore, note that examples of the successive contents of a register, rS2, is illustrated in FIG. 6 corresponding to different values of j. Note that j may represent the element offset value, where j refers to the number of buffer elements between the circular buffer base storage element (storing X0) to the beginning storage element (which stores the first circular buffer element to be extracted). For example, for j=0x0, the starting address of the subset of elements to be extracted from the circular buffer begins at the circular buffer base address plus the offset of 0x0 (i.e. the value of j). Therefore, the 6 elements X0-X5 are extracted into rS2. At this point, an evmac instruction can be executed to store the result for $Out_{0x0}$ in a destination register, rD. For j=0x1, the starting address of the subset of elements to be extracted from the circular buffer begins at the circular buffer base address plus the offset of 0x1 (i.e. the value of j). Therefore, the 6 elements X1-X6 are extracted into rS2. At this point, another evmac instruction can be executed to store the result for $Out_{0x1}$ in rD. This can be done for each value of j, as needed. For example, for j=0xB, the starting address of the subset of elements to be extracted from the circular buffer begins at the circular buffer base address plus the offset of 0xB (i.e. the value of j). Therefore, the 6 elements XB, XC, XD, XE, XF, and X0 are extracted into rS1. At this point, another evmac instruction can be executed to store the result for $Out_{0xB}$ in rD. For j=0xC, the starting address of the subset of elements to be extracted from the circular buffer begins at the circular buffer base address plus the offset of 0xC (i.e. the value of j). Therefore, the 6 elements XC, XD, XE, XF, X0, and X1 are extracted into rS1. At this point, another evmac instruction can be executed to store the result for $Out_{0xC}$ in rD.

Therefore, note that beginning at j=0xB, the subset of elements extracted from the circular buffer begin to wrap. As will be described in more examples below, the evlvcb or evlvcbm instructions along with the vperm2 instruction may be used to efficiently extract the 6 data elements from the circular buffer, even through the wrap point. Also, note that for each extraction of circular buffer elements into rS2, the last two vector elements of rS2 are unused. They may be set to 0 using a variety of different methods. For example, a full 8 elements may be extracted into rS2 each time where the last two vector elements are then cleared to zero. Alternatively, the evlvcbm instruction may be used to mask off the last two vector elements.

Figure 7:
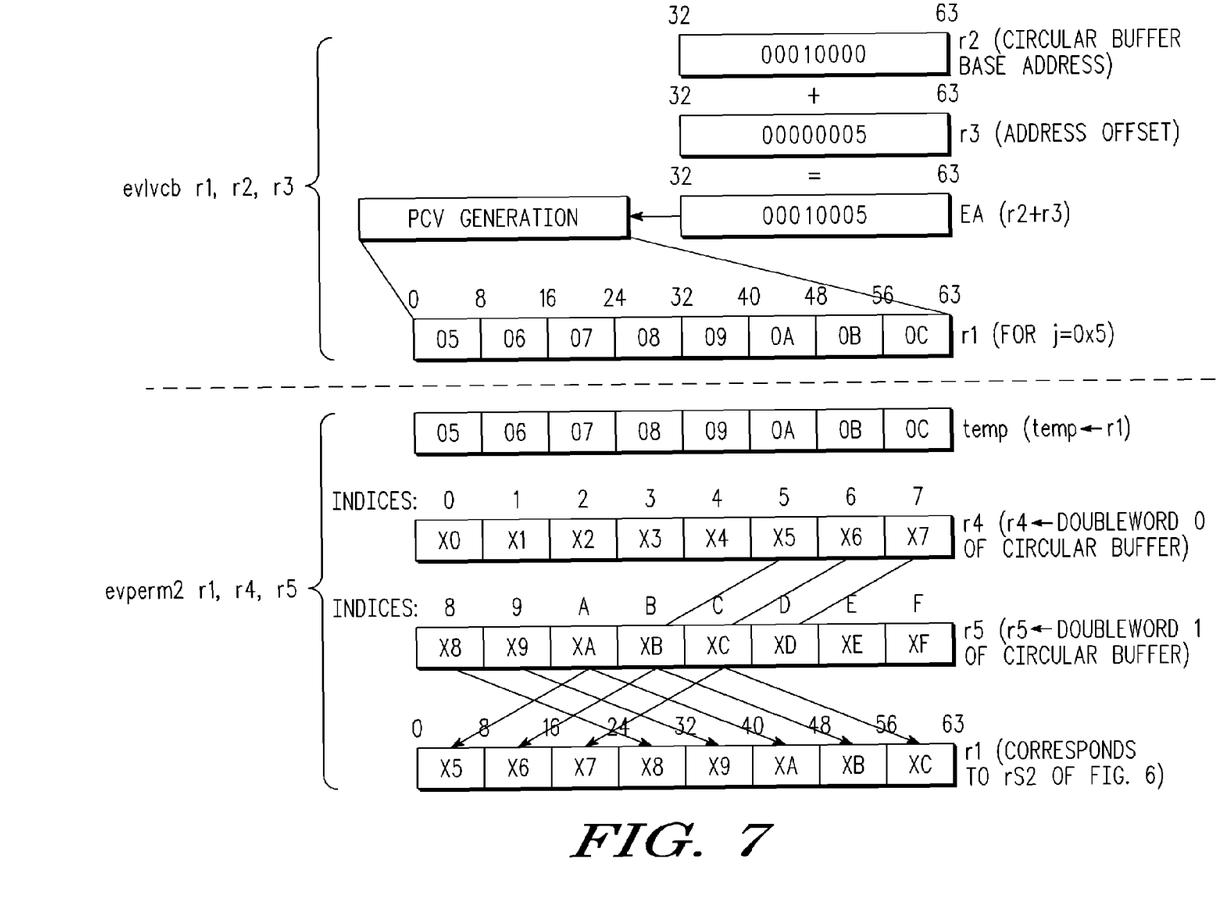
FIG. 7 illustrates in block diagram form a portion of the general purpose registers of the scalar registers of the data processor of FIG. 1 and associated data flow for generation of a permutation control vector and use of the permutation control vector to extract elements from a circular buffer in accordance with one example.

FIG. 7 illustrates in block diagram form a portion of the GPRs of scalar register file 34 and associated data flow for generation of a permutation control vector (PCV) and use of the PCV to extract elements from a circular buffer in accordance with one example. In the example of FIG. 7, the value of 0x0010000, representing the circular buffer base address, is stored in GPR r2, and an address offset value of 0x00000005 is stored in GPR r3. Upon execution of the instruction "evlvcb r1, r2, r3," the EA is calculated as r2+r3, which is 0x0010005. Note that this is the address, in memory, of the circular buffer element X5. Also, note that element X5 may be referred to as the beginning storage element since, in this example, it will be the first element to be extracted from the circular buffer element. The last 4 bits of this EA value is used as the element offset value to generate the appropriate PCV value. In the illustrated embodiment, the element offset value is 0x5, thus generating a PCV having the values 0x05 06 07 08 09 0A 0B 0C, as was described above in reference to the evlvcb instruction of FIG. 3. Therefore, as a result of the instruction "evlvcb r1, r2, r3," this PCV is stored in r1. This PCV stored in r1 can then be used by an evperm2 instruction to extract the appropriate elements from the circular buffer. For example, using the example of FIG. 6, this PCV would allow for the extraction of the 6 elements X5, X6, X7, X8, X9, and XA, which corresponds to the values for j=0x5.

With the PCV being stored in r1, an evperm2 instruction in the form of "evperm2 r1, r4, r5" can be executed to appropriately extract the elements of the circular buffer. Prior to execution of this evperm2 instruction, the 16 byte-sized elements of the circular buffer can be stored into GPRs r4 and r5, where r4 stores the first doubleword (doubleword0) of the circular buffer and r5 stores the second doubleword (doubleword1) of the circular buffer. Therefore, r4 stores elements X0-X7, and r5 stores elements X8-XF. The indices of the elements of r4 and r5 are sequentially numbered from 0x0 to 0xF. Therefore, the 8 elements of r4 correspond to indices 0x0 to 0x7, respectively, while the 8 elements of r5 correspond to indices 0x8 to 0xF. In the illustrated example, the designated first storage element of the circular buffer may refer to the first register element of r4 (which stores X0) and the designated last storage element of the circular buffer may refer to the last register element of r5 (which stores XF). Upon execution of the evperm2 instruction, the values of rD (specified as r1 in the instruction "evperm2 r1, r4, r5") is first copied to a temporary register. Therefore, the PCV is copied into a temporary register. For each byte of the destination register rD (specified as r1), a byte is selected from the source vector which corresponds to the vector elements stored in the source registers rA and rB (specified as r4 and r5 in this example). These bytes are selected by using the corresponding values of the PCV as index values into the source vector stored in r4 and r5. If the index value provided by the PCV for a particular vector element location of the destination register is out of range (is not within 0x0 to 0xF), then a predetermined constant, such as, for example, 0x0, is stored in the vector element location.

For example, for the first vector element of r1, the first vector element of the temporary register (i.e. the first vector element of the PCV) is 0x05. This provides an index into the source vector. An index value of 0x05 indicates the $6^{th}$ vector element of r4. The contents of this vector element (which is X5) is therefore stored in r1 as the first vector element. For the second vector element of r1, the second vector element of the temporary register (i.e. the second vector element of the PCV) is 0x06. This provides an index into the source vector, indicating the $7^{th}$ vector element of r4. The contents of this vector element of r4 (which is X6) is therefore stored in r1 as the second vector element. For the third vector element of r1, the third vector element of the temporary register (i.e. the third vector element of the PCV) is 0x07. This provides an index into the source vector, indicating the $8^{th}$ vector element of r4. The contents of this vector element of r4 (which is X7) is therefore stored in r1 as the third vector element. For the fourth vector element of r1, the fourth vector element of the temporary register (i.e. the fourth vector element of the PCV) is 0x08. This provides an index into the source vector, indicating the $1^{st}$ vector element of r5. The contents of this vector element of r5 (which is X8) is therefore stored in r1 as the fourth vector element. For the fifth vector element of r1, the fifth vector element of the temporary register (i.e. the fifth vector element of the PCV) is 0x09. This provides an index into the source vector, indicating the $2^{nd}$ vector element of r5. The contents of this vector element of r5 (which is X9) is therefore stored in r1 as the fifth vector element. For the sixth vector element of r1, the sixth vector element of the temporary register (i.e. the sixth vector element of the PCV) is 0x0A. This provides an index into the source vector, indicating the $3^{rd}$ vector element of r5. The contents of this vector element of r5 (which is XA) is therefore stored in r1 as the sixth vector element. For the seventh vector element of r1, the seventh vector element of the temporary register (i.e. the seventh vector element of the PCV) is 0x0B. This provides an index into the source vector, indicating the $4^{th}$ vector element of r5. The contents of this vector element of r5 (which is XB) is therefore stored in r1 as the seventh vector element. For the eighth vector element of r1, the eighth vector element of the temporary register (i.e. the eighth vector element of the PCV) is 0x0C. This provides an index into the source vector, indicating the $5^{th}$ vector element of r5. The contents of this vector element of r5 (which is XC) is therefore stored in r1 as the eighth vector element.

Therefore, r1 now stores the extracted 6 elements of the circular buffer needed for the example of FIG. 6. Therefore, in this embodiment, note that X5 may be referred to as the beginning element and XC the ending element, where the element offset value is 0x5, indicating that the beginning element, X5, is 0x5 buffer elements from the designated first buffer element, X0. Note that r1 also includes XB and XC stored in the $7^{th}$ and $8^{th}$ vector locations; however, this may be cleared to 0x0 since they are not needed in the example of FIG. 6. Alternatively, the evlvcbm instruction may have been used where the mask value would have specified that each of the last two vector elements of the PCV should be 0xFF. Since 0xFF is an out-of-range index value, no vector location of the source vector in r4 and r5 would have been indexed. Instead, the value of 0x0 would have been written into the last two vector elements of r1. An example of the execution of an evlvcbm instruction is illustrated in FIG. 8.

Figure 8:
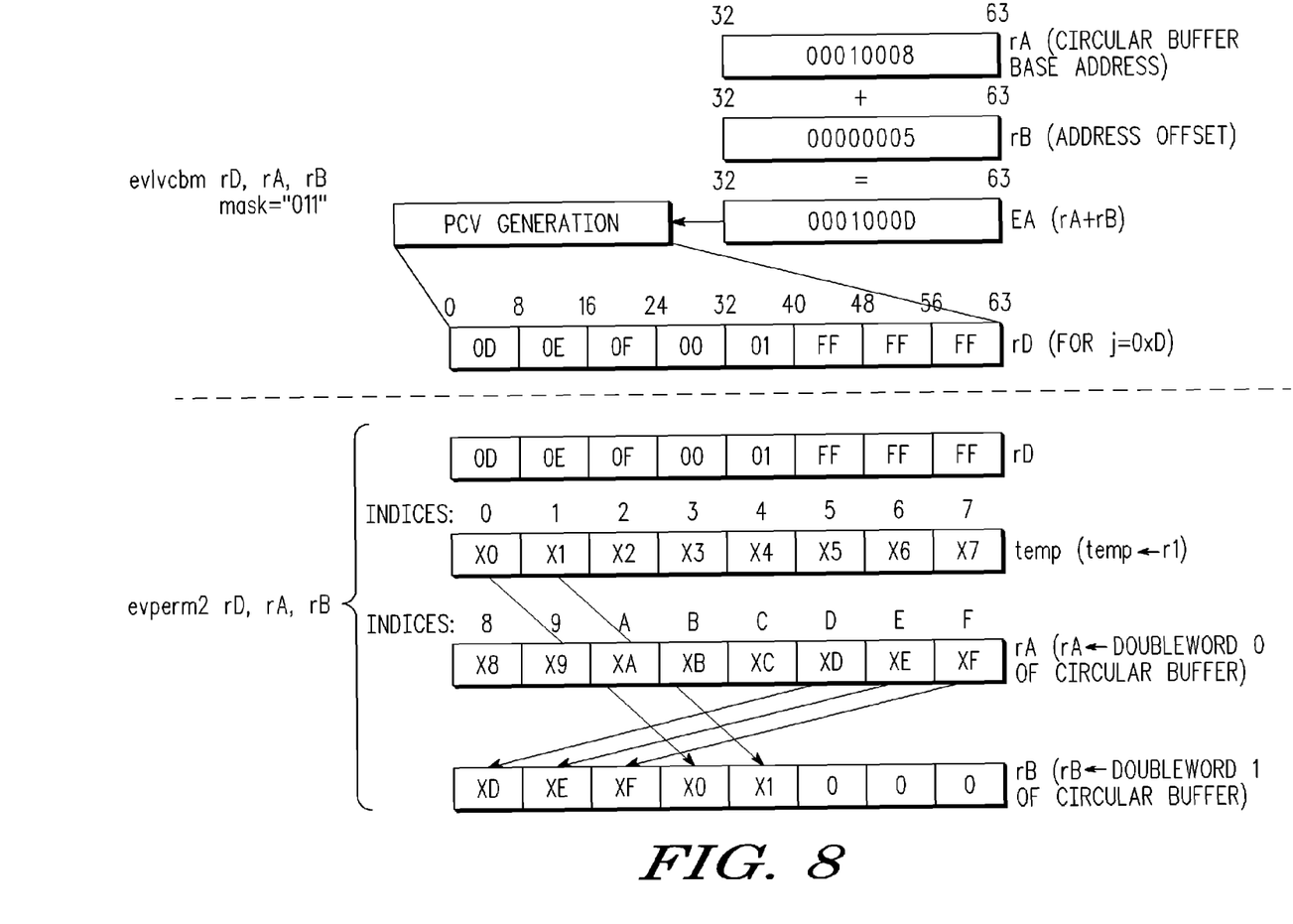
FIG. 8 illustrates in block diagram form a portion of the general purpose registers of the scalar registers of the data processor of FIG. 1 and associated data flow for generation of a permutation control vector and use of the permutation control vector to extract elements from a circular buffer in accordance with one example.

FIG. 8 illustrates in block diagram form a portion of the GPRs of scalar register file 34 and associated data flow for generation of PCV and use of the PCV to extract elements from a circular buffer in accordance with one example. In the example of FIG. 8, the value of 0x0010008, representing the circular buffer base address, is stored in GPR rA, and an offset value of 0x00000005 is stored in GPR rB. Upon execution of the instruction "evlvcbm rD, rA, rB," the EA is calculated as rA+rB, which is 0x001000D. The last 4 bits of this EA value is used as the element offset value to generate the appropriate PCV value. In the illustrated embodiment, the element offset value is 0xD, thus generating a PCV having the values 0x0D 0E 0F 00 01 02 03 04, as was described above in reference to the evlvcb instruction of FIG. 3 and the evlvcbm instruction of FIG. 5. Therefore, as a result of the instruction "evlvcbm rD, rA, rB," this PCV is stored in rD. In the current example, the 3-bit mask value for this evlvcbm instruction is assumed to be %011. This value of %011 indicates the number of lower vector elements, starting with the least significant vector location (the furthest right location in the illustrated embodiment), are to be forced to 0xFF. The value of %011 corresponds to the value of 3, therefore, the last 3 vector elements of rD are forced to 0xFF rather than being 0x02 03 04, as was indicated by the sh value. This PCV stored in rD can then be used by an evperm instruction to extract the appropriate elements from a circular buffer. For example, as shown in the example of FIG. 8, the instruction "evperm2 rD, rA, rB" can be executed to extract 5 circular buffer elements.

In the example of FIG. 8, prior to execution of the evperm2 instruction, the 16 byte-sized elements of the circular buffer can be stored into GPRs rA and RB, where rA stores the first doubleword (doubleword0) of the circular buffer and rB stress the second doubleword (doubleword1) of the circular buffer. That is, registers rA and rB can be loaded with the values X0-X7 and X8-XF, respectively. In the illustrated example, the designated first storage element of the circular buffer may refer to the first register element of rA which stores X0 and the designated last storage element of the circular buffer may refer to the last register element of rB which stores XF. Also, the value of rD may be first written to a temporary register such that the temporary register stores the PCV. In response to execution of the evperm2 instruction, each vector element of rD is filled based on the contents of the source vector indexed by a corresponding vector element of the PCV. For example, for the first vector element of rD, the first vector element of the temporary register (i.e. the first vector element of the PCV) is 0x0D. This provides an index into the source vector. An index value of 0x0D indicates the $6^{th}$ vector element of rB. The contents of this vector element (which is XD) is therefore stored in rD as the first vector element. For the second vector element of rD, the second vector element of the temporary register (i.e. the second vector element of the PCV) is 0x0E. This provides an index into the source vector, indicating the $7^{th}$ vector element of rB. The contents of this vector element of rB (which is XE) is therefore stored in rD as the second vector element. For the third vector element of rD, the third vector element of the temporary register (i.e. the third vector element of the PCV) is 0x0F. This provides an index into the source vector, indicating the $8^{th}$ vector element of rB. The contents of this vector element of rB (which is XF) is therefore stored in r1 as the third vector element. For the fourth vector element of rD, the fourth vector element of the temporary register (i.e. the fourth vector element of the PCV) is 0x00. This provides an index into the source vector, indicating the $1^{st}$ vector element of rA. The contents of this vector element of rA (which is X0) is therefore stored in rD as the fourth vector element. For the fifth vector element of rD, the fifth vector element of the temporary register (i.e. the fifth vector element of the PCV) is 0x01. This provides an index into the source vector, indicating the $2^{nd}$ vector element of rA. The contents of this vector element of rA (which is 01) is therefore stored in rD as the fifth vector element. For the sixth vector element of rD, the sixth vector element of the temporary register (i.e. the sixth vector element of the PCV) is 0xFF. This is an out-of-range index, and for out-of-range indices, a constant of 0x0 is stored in the corresponding vector element of rD. Therefore, a value of 0x0 is stored in rD as the $6^{th}$ vector element. The $7^{th}$ and $8^{th}$ vector elements of the temporary register (i.e. the $7^{th}$ and $8^{th}$ vector elements of the PCV) are also 0xFF. Therefore, the value of 0x0 is stored in each of the $7^{th}$ and $8^{th}$ vector elements of rD. Therefore, due to the mask value of %011 which caused the last 3 vector elements of rD to be set to 0xFF upon execution of the evlvcbm instruction, the last 3 vector elements rD after execution of the evperm2 instruction are 0x0, thus providing for an extraction of only 5 circular buffer elements rather than 8.

Therefore, rD now stores 5 extracted elements of the circular buffer. In this embodiment, note that XD may be referred to as the beginning element and X1 the ending element, where the element offset value is 0xD, indicating that the beginning element, XD, is 0xD buffer elements from the designated first buffer element, X0. Also, note that after accessing XF in the last designated storage element of the circular buffer, access continues in a sequential order to X0 in the first designated storage element of the circular buffer.

By now it should be appreciated that there has been provided data processing instructions for use in a data processing system which support the use of circular buffers. That is, each of the evlvcb and evlvcbm instructions can be used to generate control vectors (PCVs) which may then be used within the data processing system to extract the appropriate data elements from a circular buffer. For example, in one embodiment, a permutation instruction such as the evperm2 instruction can use the generated PCV to appropriately and efficiently extract data elements from the circular buffer, even around a wrap point of the circular buffer. Therefore, with the use of just two single instructions, a control vector can be generated and circular buffer data elements can be extracted, even around a wrap point of the circular buffer.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, data processing system 10 may include any number of separate integrated circuits or separate devices interconnected with each other. For example, memory 12 may be located on a same integrated circuit as processor 14 or on a separate integrated circuit or located within another peripheral or slave discretely separate from other elements of data processing system 10. Peripherals 18 and I/O circuitry 16 may also be located on separate integrated circuits or devices. Also for example, data processing system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations are merely illustrative. In some examples the functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 12 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, various numbering formats other than hexadecimal may be used. Changes to the data processing architecture may be used. Any of a variety of known data storage circuits may be used to implement the memories and registers. The bit sizes of the data buses, registers, vector fields and data operands may be changed depending upon the application. Additionally, the values used for the predetermined constants may be changed to have other values than the ones illustrated herein. Any type of semiconductor processing technology may be used to implement the circuitry described herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Additional Text:

1. A method for generating a control vector for accessing a circular buffer in a data processing system, the circular buffer comprising a plurality of storage elements that are arranged sequentially from a designated first storage element to a designated last storage element, and when the designated last storage element of the plurality of storage elements is accessed, the access continuing in a sequential order continuing with the designated first storage element, the method comprising:

determining a beginning storage element of the plurality of storage elements to be accessed;

determining an offset value of the beginning storage element, the offset value determined to be a predetermined number of storage elements from the designated first storage element to the beginning storage element; and     determining the control vector based on the offset value, the control vector comprising a plurality of index values, each of the plurality of index values corresponding to one of the plurality of storage elements to be accessed in the sequential order from the beginning storage element to an ending storage element.

2. The method of statement 1, further comprising:
   loading a plurality of data values from the circular buffer based on the control vector, wherein the plurality of data values are permuted to produce a plurality of permutated data values; and
   using the plurality of permutated data values in an execution unit of the data processing system.
3. The method of statement 1, wherein the circular buffer is formed using a general purpose register in a processor.
4. The method of statement 1, further comprising:
   providing a first source register for storing the control vector;
   providing at least one other source register for storing a plurality of circular buffer data values corresponding to the plurality of index values;
   determining a plurality of locations in a destination register for storing the plurality of circular buffer data values based on the plurality of index values;
   using the plurality of index values to store the plurality of circular buffer data values from the at least one other source register to corresponding locations in the destination register; and
   using the plurality of circular buffer data values in the destination register in an execution unit of the data processing system.
5. The method of statement 4, further comprising:
   determining that one or more of the plurality of index values are outside of a predetermined range; and
   setting the circular buffer data values in one or more destination register locations corresponding to one or more locations of the first source register which store the one or more of the plurality of index values which are outside of the predetermined range to a predetermined constant value.
6. The method of statement 5, wherein the predetermined constant value is zero.
7. The method of statement 1, wherein determining a beginning storage element of the plurality of storage elements to be accessed further comprises:
   determining a base address of the beginning storage element;
   calculating an effective address from the base address; and
   updating the base address to be a new base address using the effective address.
8. The method of statement 7, further comprising combining the base address with an immediate address to produce the effective address.
9. The method of statement 8, further comprising providing a portion of the effective address to a permutation control vector generator.
10. In a data processing system having a plurality of general purpose registers, a method comprising:
   forming a circular buffer from a plurality of storage elements of the plurality of general purpose registers, wherein the plurality of storage elements store a plurality of circular buffer values;
   in response to a first instruction, combining a base address with an offset value to form an effective address for calculating a plurality of circular buffer index values; and
   extracting a plurality of circular buffer data values in response to a second instruction, wherein the second instruction identifies a first source register, a second source register, and a destination register, all from the plurality of general purpose registers, the first source register for storing the plurality of circular buffer index values, the second source register for storing the circular buffer values, and the destination register for storing a result of executing the second instruction, wherein each index value of the plurality of circular buffer index values stored in the first source register corresponds to a particular vector element location of the circular buffer indicated by the index value and results in a circular buffer value stored at the particular vector element location being stored into a predetermined vector element of the destination register.
11. The method of statement 10, wherein the first source register and the destination register are a same register of the plurality of general purpose registers.
12. The method of statement 10, further comprising using the plurality of circular buffer index values in an execution unit of the data processing system.
13. The method of statement 10, wherein combining the base address with the offset value to form the effective address further comprises adding the offset value to the base address to form the effective address.
14. The method of statement 10, further comprising:
   determining that one or more of the plurality of circular buffer index values are outside of a predetermined range, and
   setting one or more vector elements of the destination register corresponding to the plurality of circular buffer index values determined to be outside of the predetermined range to a predetermined constant value.
15. The method of statement 14 wherein the predetermined constant value is zero.
16. A method comprising:
   providing a circular buffer having a plurality of storage elements that are arranged sequentially from a designated first storage element to a designated last storage element, and when the designated last storage element of the plurality of storage elements is accessed, the access continuing in a sequential order continuing with the designated first storage element;
   determining a beginning storage element of the plurality of storage elements to be accessed; and
   generating a control vector, the control vector comprising a plurality of index values, each of the plurality of index values corresponding to one of the plurality of storage elements of the circular buffer to be accessed in the sequential order from the beginning storage element to an ending storage element.
17. The method of statement 16, further comprising determining an offset value of the beginning storage element, the offset value determined to be a predetermined number of least significant bits of an address of the beginning storage element, wherein the offset value is provided to a permutation control vector generator for controlling generation of the control vector.
18. The method of statement 16, further comprising:
   determining that one or more of the plurality of index values are outside of a predetermined range, and
   setting one or more vector elements of a destination register corresponding to the plurality of index values determined to be outside of the predetermined range to a predetermined constant value.
19. The method of statement 16, wherein the circular buffer is formed from one or more general purpose registers of a data processing system.
20. The method of statement 16, wherein an effective address of the beginning storage element is determined by adding an offset to a base address.

What is claimed is:

1. A method for generating a control vector for accessing a circular buffer in a data processing system, the circular buffer comprising a plurality of storage elements that are arranged sequentially from a designated first storage element to a designated last storage element, and when the designated last storage element of the plurality of storage elements is accessed, the access continuing in a sequential order continuing with the designated first storage element, the method comprising:

determining a beginning storage element of the plurality of storage elements to be accessed;

determining an offset value of the beginning storage element, the offset value determined to be a predetermined number of storage elements from the designated first storage element to the beginning storage element;

determining the control vector based on the offset value, the control vector comprising a plurality of index values, each of the plurality of index values corresponding to one of the plurality of storage elements to be accessed in the sequential order from the beginning storage element to an ending storage element;

providing a first source register for storing the control vector;

providing at least one other source register for storing a plurality of circular buffer data values corresponding to the plurality of index values;

determining a plurality of locations in a destination register for storing the plurality of circular buffer data values based on the plurality of index values;

using the plurality of index values to store the plurality of circular buffer data values from the at least one other source register to corresponding locations in the destination register;

using the plurality of circular buffer data values in the destination register in an execution unit of the data processing system;

determining that one or more of the plurality of index values are outside of a predetermined range; and setting the circular buffer data values in one or more destination register locations corresponding to one or more locations of the first source register which store the one or more of the plurality of index values which are outside of the predetermined range to a predetermined constant value.

2. The method of claim 1, wherein the circular buffer is formed using a general purpose register in a processor.

3. The method of claim 1, wherein the step of using the plurality of index values to store the plurality of circular buffer data values from the at least one other source register to corresponding locations in the destination register comprises permuting the plurality of circular buffer data values such that the plurality of circular buffer data values stored in the destination register are permuted.

4. The method of claim 1, wherein the predetermined constant value is zero.

5. A method for generating a control vector for accessing a circular buffer in a data processing system, the circular buffer comprising a plurality of storage elements that are arranged sequentially from a designated first storage element to a designated last storage element, and when the designated last storage element of the plurality of storage elements is accessed, the access continuing in a sequential order continuing with the designated first storage element, the method comprising:

determining a beginning storage element of the plurality of storage elements to be accessed;

determining an offset value of the beginning storage element, the offset value determined to be a predetermined number of storage elements from the designated first storage element to the beginning storage element; and determining the control vector based on the offset value, the control vector comprising a plurality of index values, each of the plurality of index values corresponding to one of the plurality of storage elements to be accessed in the sequential order from the beginning storage element to an ending storage element;

wherein determining a beginning storage element of the plurality of storage elements to be accessed further comprises:

determining a base address of the beginning storage element;

calculating an effective address from the base address by combining the base address with an immediate address to produce the effect address; and updating the base address to be a new base address using the effective address; and providing a portion of the effective address to a permutation control vector generator.

6. In a data processing system having a plurality of general purpose registers, a method comprising:

forming a circular buffer from a plurality of storage elements of the plurality of general purpose registers, wherein the plurality of storage elements store a plurality of circular buffer values;

in response to a first instruction, combining a base address with an offset value to form an effective address for calculating a plurality of circular buffer index values;

extracting a plurality of circular buffer data values in response to a second instruction, wherein the second instruction identifies a first source register, a second source register, and a destination register, all from the plurality of general purpose registers, the first source register for storing the plurality of circular buffer index values, the second source register for storing the circular buffer values, and the destination register for storing a result of executing the second instruction, wherein each index value of the plurality of circular buffer index values stored in the first source register corresponds to a particular vector element location of the circular buffer indicated by the index value and results in a circular buffer value stored at the particular vector element location being stored into a predetermined vector element of the destination register;

determining that one or more of the plurality of circular buffer index values are outside of a predetermined range, and setting one or more vector elements of the destination register corresponding to the plurality of circular buffer index values determined to be outside of the predetermined range to a predetermined constant value.

7. The method of claim 6, wherein the first source register and the destination register are a same register of the plurality of general purpose registers.

8. The method of claim 6, further comprising using the plurality of circular buffer index values in an execution unit of the data processing system.

9. The method of claim 6, wherein combining the base address with the offset value to form the effective address further comprises adding the offset value to the base address to form the effective address.

10. The method of claim 6 wherein the predetermined constant value is zero.

11. A method comprising:

providing a circular buffer having a plurality of storage elements that are arranged sequentially from a designated first storage element to a designated last storage element, and when the designated last storage element of the plurality of storage elements is accessed, the access continuing in a sequential order continuing with the designated first storage element;

determining a beginning storage element of the plurality of storage elements to be accessed;

generating a control vector, the control vector comprising a plurality of index values, each of the plurality of index values corresponding to one of the plurality of storage elements of the circular buffer to be accessed in the sequential order from the beginning storage element to an ending storage element; and determining an offset value of the beginning storage element, the offset value determined to be a predetermined number of least significant bits of an address of the beginning storage element, wherein the offset value is provided to a permutation control vector generator for controlling generation of the control vector.

12. The method of claim 11, further comprising:

determining that one or more of the plurality of index values are outside of a predetermined range, and setting one or more vector elements of a destination register corresponding to the plurality of index values determined to be outside of the predetermined range to a predetermined constant value.

13. The method of claim 11, wherein the circular buffer is formed from one or more general purpose registers of a data processing system.

14. The method of claim 11, wherein an effective address of the beginning storage element is determined by adding an offset to a base address.

* * * * *